US008602448B2

(12) United States Patent
Choi et al.

(10) Patent No.: US 8,602,448 B2
(45) Date of Patent: Dec. 10, 2013

(54) FRONTAL CENTER CURTAIN AIRBAG FOR VEHICLE

(71) Applicants: Hyundai Motor Company, Seoul (KR); Kia Motors Corp., Seoul (KR)

(72) Inventors: Jun Yeol Choi, Seoul (KR); Wan Dong Yoo, Suwon-si (KR); Sung Woo Lee, Yongin-si (KR)

(73) Assignees: Hyundai Motor Company, Seoul (KR); Kia Motors Corp., Seoul (KR); Autoliv Development AB, Vargarda (SE)

( * ) Notice: Subject to any disclaimer, the term of this patent is extended or adjusted under 35 U.S.C. 154(b) by 0 days.

(21) Appl. No.: 13/682,353

(22) Filed: Nov. 20, 2012

(65) Prior Publication Data

US 2013/0300092 A1 Nov. 14, 2013

(30) Foreign Application Priority Data

May 10, 2012 (KR) ........................ 10-2012-0049653

(51) Int. Cl.
*B60R 21/213* (2011.01)
(52) U.S. Cl.
USPC ....................................................... 280/730.1
(58) Field of Classification Search
USPC ................. 280/728.2, 730.1, 730.2, 740, 742
See application file for complete search history.

(56) References Cited

U.S. PATENT DOCUMENTS

| 2,834,609 | A | * | 5/1958 | Bertrand | 280/739 |
| 3,774,936 | A | * | 11/1973 | Barnett et al. | 280/730.1 |
| 4,298,214 | A | * | 11/1981 | Brown, Jr. | 280/735 |
| 5,470,103 | A | * | 11/1995 | Vaillancourt et al. | 280/730.1 |
| 5,607,179 | A | * | 3/1997 | Lenart et al. | 280/728.2 |
| 6,932,380 | B2 | * | 8/2005 | Choi | 280/730.1 |
| 7,918,480 | B2 | * | 4/2011 | Kwon et al. | 280/728.2 |
| 8,007,003 | B2 | * | 8/2011 | Kalandek | 280/740 |
| 8,328,228 | B2 | * | 12/2012 | Lee et al. | 280/730.1 |
| 2005/0082797 | A1 | * | 4/2005 | Welford et al. | 280/730.2 |
| 2008/0073889 | A1 | * | 3/2008 | Nakao et al. | 280/730.2 |
| 2010/0225096 | A1 | * | 9/2010 | Bustos Garcia et al. | 280/730.1 |
| 2012/0049491 | A1 | * | 3/2012 | Yoo | 280/729 |
| 2012/0133114 | A1 | * | 5/2012 | Choi et al. | 280/728.2 |
| 2013/0069348 | A1 | * | 3/2013 | Choi et al. | 280/730.2 |

\* cited by examiner

*Primary Examiner* — Joseph Rocca
*Assistant Examiner* — Robert A Coker
(74) *Attorney, Agent, or Firm* — Morgan, Lewis & Bockius LLP

(57) ABSTRACT

A frontal center curtain airbag for a vehicle may include a pair of housing frames spaced from each other in forward and rearward directions to cross the vehicle in a widthwise direction of the vehicle, a plurality of connecting frames connecting upper ends and opposite side ends of the spaced housing frames in forward and rearward directions to form an installation space together with the housing frames, an airbag cushion installed in the installation space and surrounded by the housing frames and the connecting frames, and an airbag door coupled to lower ends of the housing frames and the connecting frames to close a lower end of the installation space.

11 Claims, 5 Drawing Sheets

FRONTAL CENTER CURTAIN AIRBAG FOR VEHICLE

CROSS-REFERENCE TO RELATED APPLICATION

The present application claims priority to Korean Patent Application No. 10-2012-0049653 filed on May 10, 2012, the entire contents of which is incorporated herein for all purposes by this reference.

BACKGROUND

1. Field of the Invention

The present invention relates to a frontal center curtain airbag for a vehicle which prevents a collision between an interior material and a passenger in the vehicle through control of a front deviation of the passenger in a rear seat of the vehicle.

2. Description of Related Art

Various safety devices are mounted to an interior of a vehicle, and airbags are the most representative safety devices. According to the related art, various types of airbags are installed to protect passengers, and mainly include a front airbag, a side airbag, an assistant airbag, a knee airbag, and a curtain airbag.

Meanwhile, during a head-on collision of a vehicle, damage to front and rear seat passengers due to collisions in the interior of the vehicle is becoming a serious problem. That is, when a rear seat passenger does not wear a belt, secondary collisions between front and rear seat passengers, or a seat and an interior part, and a rear seat passenger occur, increasing a damage value to the front or rear passenger.

Thus, a rear seat safety device for a vehicle has been poorly provided, and in most cases, rear seat passengers do not wear safety belts, which deteriorates the problem. As compared with a front seat equipped various safety devices such as an airbag and an PT belt, a rear seat is poorly equipped with a safety device except for a curtain airbag, which especially causes a problem during a head-on collision.

However, there is provided almost no safety device for protecting a rear seat passenger who does not wear a safety belt during a head-on collision, and even in this case, a need for an airbag for sufficiently protecting a rear seat passenger is acute.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a frontal center curtain airbag for a vehicle which prevents a collision between an interior material and a passenger in the vehicle through control of a front deviation of the passenger in a rear seat of the vehicle.

In an aspect of the present invention, a frontal center curtain airbag apparatus for a vehicle, may include a pair of housing frames spaced from each other in forward and rearward directions of the vehicle to cross the vehicle in a widthwise direction of the vehicle, a plurality of connecting frames connecting upper ends and opposite side ends of the spaced housing frames in the forward and rearward directions of the vehicle to form an installation space together with the housing frames, an airbag cushion installed in the installation space and surrounded by the housing frames and the connecting frames, and an airbag door coupled to lower ends of the housing frames and the connecting frames to close a lower end of the installation space, wherein roof side center panels are coupled to the opposite side ends of the housing frames or the connecting frames, wherein a roof outer panel is coupled to an upper end of the housing frames or the connecting frames, and wherein a periphery of the airbag door is coupled to a headliner.

A coupling flange is formed to extend upwards on an upper end surface of the airbag door at a point spaced inward along a periphery thereof, wherein a lower end of the housing frames or the connecting frames is coupled to the coupling flange.

An outer periphery of the coupling flange of the airbag door is coupled to the headliner.

A hollow portion corresponding to a shape of the airbag door is formed in the headliner such that the periphery of the airbag door is coupled to the hollow portion, and steps are formed at a portion where the headliner and the airbag door are engaged with each other such that lower end surfaces of the headliner and the airbag door are formed coplanar.

The opposite side ends of the housing frames are formed to be stepped to be coupled to the roof side center panels while surface-contacting the roof side center panels.

The opposite side ends of the housing frames are connected each other by an opposite side portion.

The opposite side ends of the housing frames are connected each other by an auxiliary bracket.

The frontal center curtain airbag apparatus may include a pair of roof rail brackets installed at front and rear sides of the pair of housing frames to cross the vehicle in the widthwise direction of the vehicle to reinforce a strength of a body of the vehicle, wherein the front ends and rear ends of the pair of housing frames are coupled to the roof rail brackets, respectively.

Lower ends of the roof rail brackets are coupled together with a periphery of the airbag door and the headliner.

Steps engaged with each other are formed at portions where the headliner and the airbag door are matched to be coupled to each other, wherein coupling holes are formed at overlapping step portions, wherein coupling bosses inserted into the coupling holes from the upper side is formed at lower ends of the roof rail brackets, and wherein a fastener is inserted into lower sides of the coupling holes and coupled to the coupling bosses.

An inflator is coupled to one side of the installation space of the housing frames along a lengthwise direction of the housing frames, wherein a gas injection hole of the inflator is located at a middle portion of the housing frames.

A gas guide for dividing a gas into left and right parts is coupled to the gas injection hole of the inflator.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
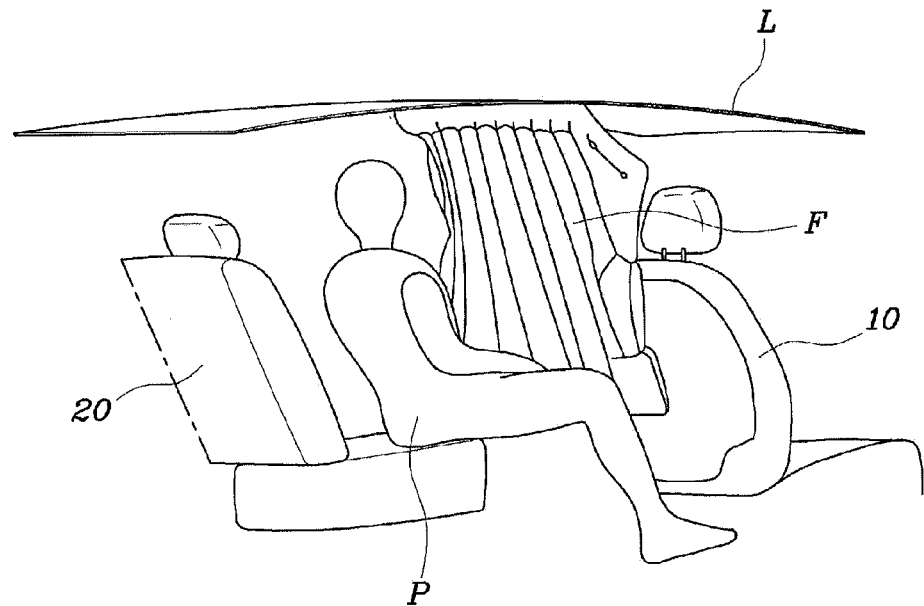
FIG. 1 is a view illustrating a state where a frontal center curtain airbag for a vehicle according to an exemplary embodiment of the present invention is deployed.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a frontal center curtain airbag for a vehicle according to an exemplary embodiment of the present invention will be described with reference to the accompanying drawings.

FIG. 1 is a view illustrating a state where a frontal center curtain airbag for a vehicle according to the exemplary embodiment of the present invention is deployed. The frontal center curtain airbag (FCCA) for a vehicle provided in an exemplary embodiment of the present invention is a new airbag applied for the first time, and FIG. 1 illustrates a deployment state thereof. As can be seen in FIG. 1, the frontal center curtain airbag F serves to protect a front side of a passenger P in a rear seat 20 while being deployed downward toward an interior of the vehicle from a roof L between a front seat 10 and the rear seat 20. Thus, the frontal center curtain airbag is preferably installed at a central portion of the roof on a side of the interior of the vehicle.

Figure 2:
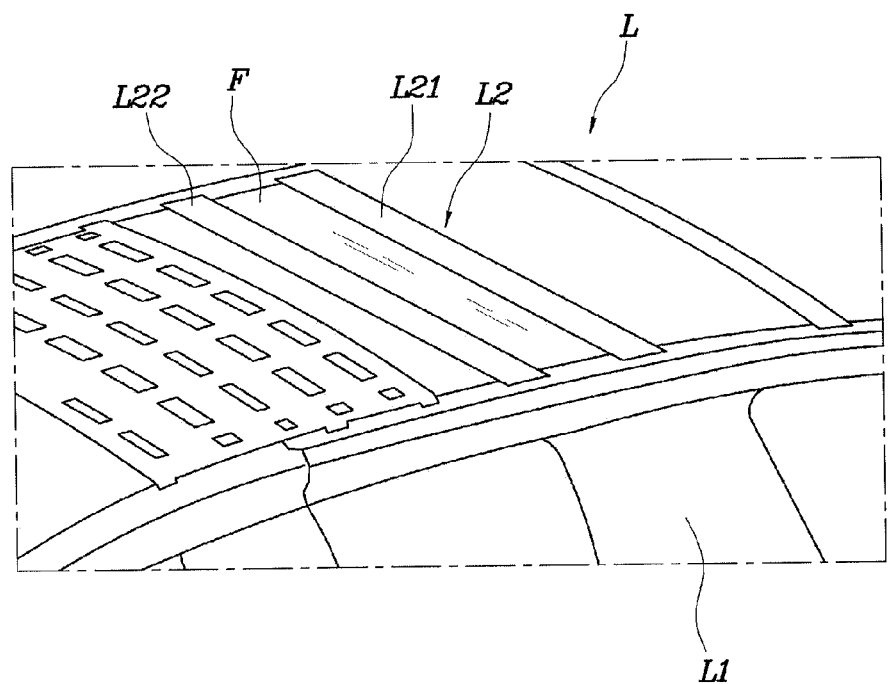
FIG. 2 is a view illustrating a state where the frontal center curtain airbag of FIG. 1 is mounted.

FIG. 2 is a view illustrating a state where the frontal center curtain airbag of FIG. 1 is mounted. The frontal center curtain airbag F of the present invention is installed on a side of a roof L of a Body-In-White (BIW) of the vehicle, and is installed in a space between a roof outer panel R (see FIG. 7) and a headliner H. At the same time, opposite sides of the frontal center curtain airbag F is coupled to roof side center panels L1, front and rear sides thereof are coupled to roof rail brackets L21 and L22, and an upper side thereof is coupled to the roof outer panel R, so that the frontal center curtain airbag F serves to further reinforce a strength of a body of the vehicle according to the related art.

In detail, the frontal center curtain airbag F of the present invention includes: a pair of housing frames 100 spaced from each other in forward and rearward directions to cross the vehicle in a widthwise direction of the vehicle, a plurality of connecting frames 200 connecting upper ends 120 and opposite side ends 160 of the spaced housing frames 100 in forward and rearward directions to form an installation space together with the housing frames 100, an airbag cushion 300 installed in the installation space and surrounded by the housing frames 100 and the connecting frames 200, and an airbag door 400 coupled to lower ends of the housing frames 100 and the connecting frames 200 to close a lower end of the installation space. Roof side center panels L1 are coupled to opposite side ends of the housing frames 100 or the connecting frames 200, a roof outer panel R is coupled to an upper end of the housing frames 100 or the connecting frames 200, and a periphery of the airbag door 400 is coupled to a headliner H.

Figure 3:
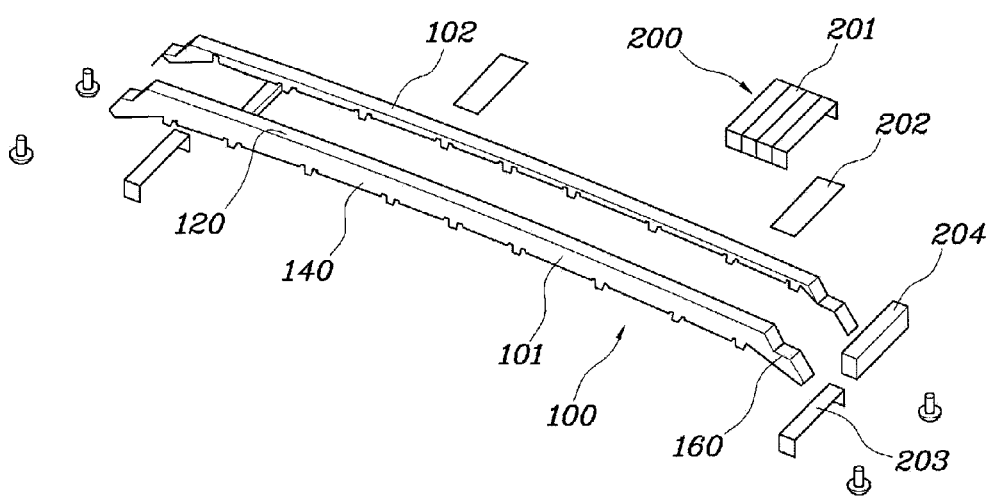
FIGS. 3 and 4 are exploded perspective views of the frontal center curtain airbag of FIG. 1.
Figure 4:
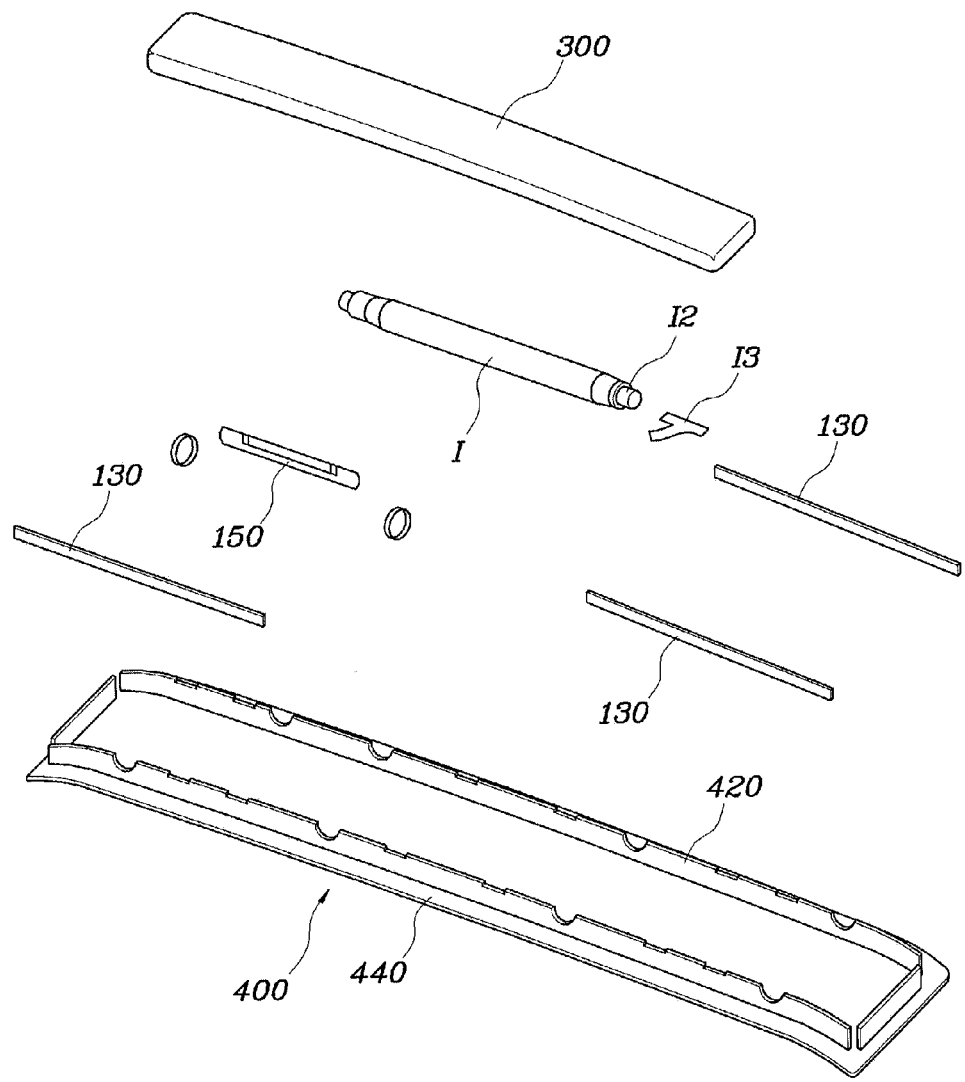
Figure 5:
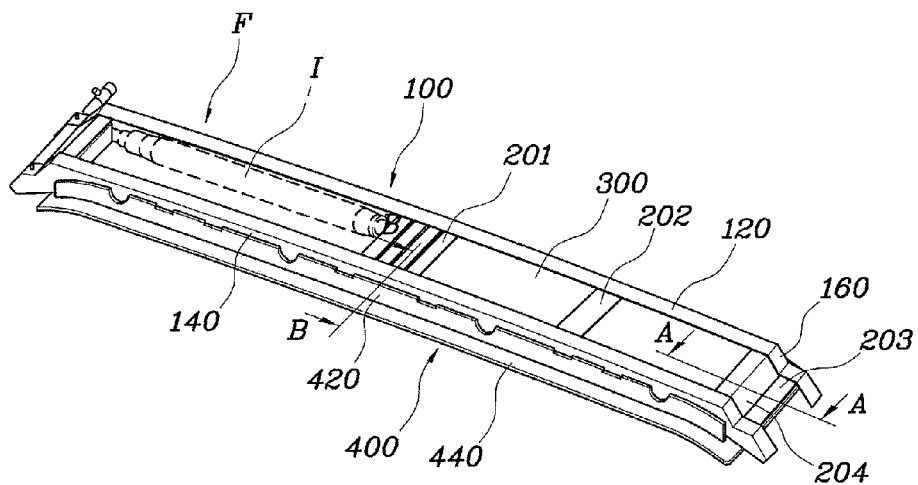
FIG. 5 is a view illustrating a state where the frontal center curtain airbag of FIG. 1 is assembled.

FIGS. 3 and 4 are exploded perspective views of the frontal center curtain airbag of FIG. 1. FIG. 5 is a view illustrating a state where the frontal center curtain airbag of FIG. 1 is assembled. The frontal center curtain airbag F of the present invention mainly includes a housing and a cushion 300. The housing is formed in a framework, and includes: a pair of housing frames 100 spaced from each other in forward and rearward directions to cross the vehicle in a widthwise direction of the vehicle, and a plurality of connecting frames 200 connecting upper ends 120 and opposite side ends 160 of the spaced housing frames 100 in forward and rearward directions to form an installation space together with the housing frames 100.

Each of the connecting frame 200 includes a central portion 201, opposite side portions 204 and an auxiliary portion 202, and an auxiliary bracket 203 is coupled to the opposite side portions 204. Both lightness and strength can be secured through the framework-shaped housing frames 100 and the connecting frames 200.

In particular, as illustrated in the drawings, the housing frames 100 are bent in an L-like shape, upper end surfaces 120 thereof are coupled to the roof outer panel R of the vehicle, and a lower end 140 thereof is coupled to the airbag door 400, and the airbag door 400 is coupled to the headliner H, so that strength can be secured.

Side ends 160 of the housing frames 100 are fixed to the roof side center panels L1 and a front end of the front housing frame 101 and a rear end of the rear housing frame 102 are coupled to roof rail brackets L2, respectively, so that a strength of the body of the vehicle can be reinforced. The roof rail brackets L2 includes a pair of roof rail brackets L21 and L22 on front and rear sides, and the frontal center curtain airbag F is coupled therebetween to secure strength.

Through this structure, a vehicle to which the frontal center curtain airbag of the present invention is applied can secure a higher strength of the body of the vehicle as compared with a vehicle according to the related art in spite that the airbag is mounted to the vehicle.

Figure 6:
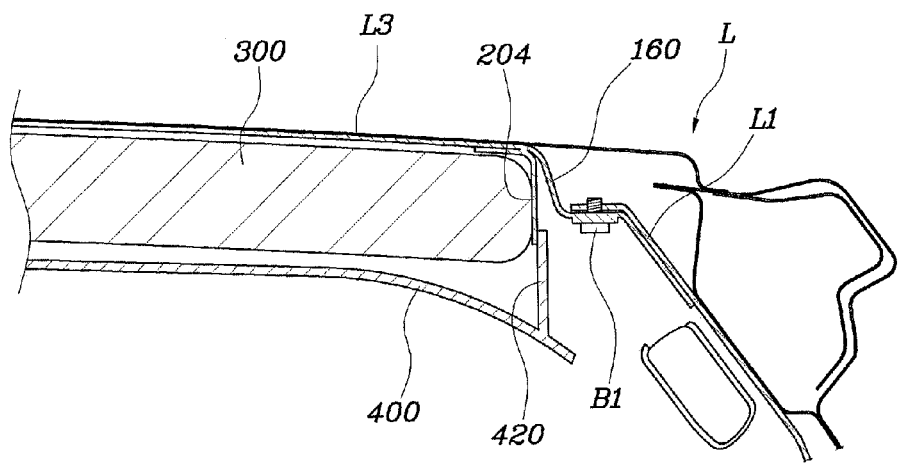
FIG. 6 is a sectional view of the frontal center curtain airbag of FIG. 5 taken along line A-A.
Figure 7:
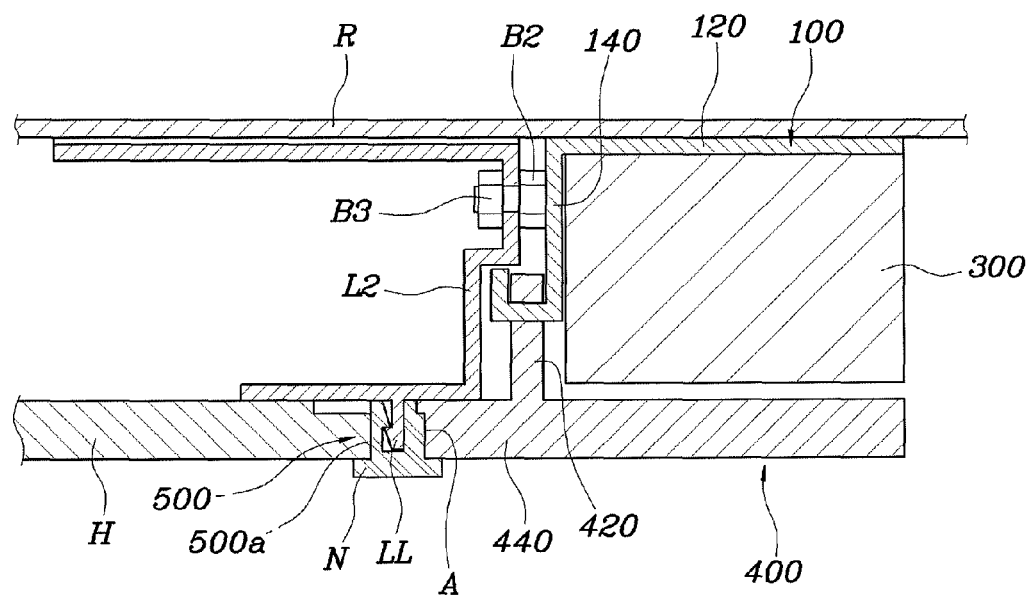
FIG. 7 is a sectional view of the frontal center curtain airbag of FIG. 5 taken along line B-B.

FIG. 6 is a sectional view of the frontal center curtain airbag of FIG. 5 taken along line A-A. FIG. 7 is a sectional view of the frontal center curtain airbag of FIG. 5 taken along line B-B.

Here, a coupling flange 420 extending upward is formed on an upper end surface of the airbag door 400 at a point spaced inward along a periphery thereof, and a lower end of the housing frames 100 or the connecting frames 200 is coupled to the coupling flange 420, whereby the airbag door and the housing can be integrally modulized to be mounted to the vehicle. In detail, the coupling flange 420 is formed along a periphery of the airbag door 400, and lower ends of the housing frames 100 and lower ends of the connecting frames 200 through hook coupling with the coupling flange 420, whereby they can be coupled easily.

An outer periphery 440 of the coupling flange 420 of the airbag door 400 is coupled to the headliner H, a hollow portion corresponding to a shape of the airbag door 400 is formed in the headliner H such that the periphery 440 of the airbag door 400 is coupled to the hollow portion, and steps 500a are formed at a portion where the headliner H and the airbag door 400 to be engaged with each other such that lower end surfaces of the headliner H and the airbag door 400 form a same plane.

As can be seen in FIG. 7, the steps 500a are formed at a portion where the headliner H and the airbag door 400 to be engaged with each other such that lower end surfaces of the headliner H and the airbag door 400 form a same plane. The frontal center curtain airbag further includes a pair of roof rail brackets L2 installed at front and rear sides of the pair of housing frames 100 to cross the vehicle in a widthwise direction of the vehicle to reinforce a strength of a body of the vehicle, and front ends and rear ends of the pair of housing frames 100 are coupled to the front and rear roof rail brackets L2, respectively.

In particular, lower ends of the roof rail brackets L2 are coupled to the periphery 440 of the airbag door 400 and the headliner H, coupling holes A are formed at overlapping step portions 500 of the headliner H and the airbag door 400, coupling bosses LL inserted into the coupling holes A from the upper side is formed at lower ends of the roof rail brackets L2, and a fastener N is inserted into lower sides of the coupling holes A such that the fastener N and the coupling bosses LL are coupled to each other.

The frontal center curtain airbag of the present invention is manufactured through a process of installing the frontal center curtain airbag in a BIW of the vehicle and assembling the headliner under the frontal center curtain airbag, and the headliner H, the airbag door 400, and the roof rail brackets L2 are easily coupled together by inserting the fastener N in the process.

To this end, the fastener N is inserted into the coupling holes A, a recess is formed at a center of the fastener N, the coupling bosses LL of the roof rail brackets L2 are inserted into the recess of the fastener N to be hook-coupled to the fastener N. That is, the headliner H, the airbag door 400 and the roof rail brackets L2 are coupled together in one touch through a stepped structure and hook coupling.

Meanwhile, the roof rail brackets L2 are bent in a U-like shape, upper end surfaces thereof are coupled to the roof outer panel R, and side end surfaces thereof are coupled to the housing frames 100, and lower end surfaces thereof are coupled to the headliner H and the airbag door 400 to sufficiently secure a strength of the body of the vehicle.

The roof rail brackets L2 and the housing frames may be coupled such that bolts B2 are integrally formed with the housing frames 100 and are fixed by nuts B3 on opposite sides after passing through the roof rail brackets L2.

As can be seen in FIG. 6, opposite side ends 160 of the housing frames 100 are stepped to be coupled while surface-contacting the roof side center panel L1. Since the housing frames 100 and the roof side center panels L1 are coupled to each other while surface-contacting each other, the housing frames 100 and the roof side center panels L1 can secure a strength of the body while mutually supporting each other through the stepped shape.

Meanwhile, as can be seen in FIG. 4, an inflator I is coupled to one side of the installation space of the housing frames 100 along a lengthwise direction of the housing frames 100, and a gas injection hole 12 of the inflator I is located at a middle portion of the housing frames 100. A gas guide 13 for dividing a gas into left and right parts is coupled to the gas injection hole 12 of the inflator I, so that a gas can be uniformly injected to opposite sides and a cushion can be horizontally deployed.

To this end, the cushion 300 is coupled to the housing frames 100 through the brackets 130, and a portion where the inflator I is located is coupled to the housing frames 100 by inflator brackets 150.

According to the frontal center curtain airbag for a vehicle having the an above-described structure, during a head-on collision of the vehicle, in particular, when a rear seat passenger does not wear a safety belt, a front behavior of the rear seat passenger can be restricted, making it possible to prevent a collision with a front seat passenger or an interior material.

Further, a center airbag is installed in a roof to be deployed, making it unnecessary to change a design layout of an interior of the vehicle, and an additional strength of the body of the vehicle can be advantageously secured through housing frames at the same time when the airbag is installed.

In addition, both lightness and strength can be simultaneously realized by applying an airbag housing to a framework-shaped frame, making it possible to change an existing reinforcement when the airbag housing is coupled and making easy to secure a strength of the body.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A frontal center curtain airbag apparatus for a vehicle, comprising:
   a pair of housing frames spaced from each other in forward and rearward directions of the vehicle to cross the vehicle in a widthwise direction of the vehicle;
   a plurality of connecting frames connecting upper ends and opposite side ends of the spaced housing frames in the forward and rearward directions of the vehicle to form an installation space together with the housing frames;
   an airbag cushion installed in the installation space and surrounded by the housing frames and the connecting frames; and
   an airbag door coupled to lower ends of the housing frames and the connecting frames to close a lower end of the installation space;
   wherein pillars are coupled to the opposite side ends of the housing frames or the connecting frames;
   wherein a roof outer panel is coupled to an upper end of the housing frames or the connecting frames;
   wherein a periphery of the airbag door is coupled to a headliner;
   wherein a coupling flange is formed to extend upwards on an upper end surface of the airbag door at a point spaced inward along a periphery thereof; and
   wherein a lower end of the housing frames or the connecting frames is coupled to the coupling flange.

2. The frontal center curtain airbag apparatus of claim 1, wherein an outer periphery of the coupling flange of the airbag door is coupled to the headliner.

3. The frontal center curtain airbag apparatus of claim 1,
wherein a hollow portion corresponding to a shape of the airbag door is formed in the headliner such that the periphery of the airbag door is coupled to the hollow portion, and
wherein steps are formed at a portion where the headliner and the airbag door are engaged with each other such that lower end surfaces of the headliner and the airbag door are formed coplanar.

4. The frontal center curtain airbag apparatus of claim 1, wherein the opposite side ends of the housing frames are formed to be stepped to be coupled to the pillars while surface-contacting the pillars.

5. The frontal center curtain airbag apparatus of claim 4, wherein the opposite side ends of the housing frames are connected to each other by an opposite side portion.

6. The frontal center curtain airbag apparatus of claim 4, wherein the opposite side ends of the housing frames are connected to each other by an auxiliary bracket.

7. The frontal center curtain airbag apparatus of claim 1, further comprising:
a pair of roof rail brackets installed at front and rear sides of the pair of housing frames to cross the vehicle in the widthwise direction of the vehicle to reinforce a strength of a body of the vehicle,
wherein the front ends and rear ends of the pair of housing frames are coupled to the roof rail brackets, respectively.

8. The frontal center curtain airbag apparatus of claim 7, wherein lower ends of the roof rail brackets are coupled together with a periphery of the airbag door and the headliner.

9. The frontal center curtain airbag apparatus of claim 1,
wherein an inflator is coupled to one side of the installation space of the housing frames along a lengthwise direction of the housing frames, and
wherein a gas injection hole of the inflator is located at a middle portion of the housing frames.

10. The frontal center curtain airbag apparatus of claim 9, wherein a gas guide for dividing a gas into left and right parts is coupled to the gas injection hole of the inflator.

11. A frontal center curtain airbag apparatus for a vehicle, comprising:
a pair of housing frames spaced from each other in forward and rearward directions of the vehicle to cross the vehicle in a widthwise direction of the vehicle;
a plurality of connecting frames connecting upper ends and opposite side ends of the spaced housing frames in the forward and rearward directions of the vehicle to form an installation space together with the housing frames;
an airbag cushion installed in the installation space and surrounded by the housing frames and the connecting frames; and
an airbag door coupled to lower ends of the housing frames and the connecting frames to close a lower end of the installation space; and
a pair of roof rail brackets installed at front and rear sides of the pair of housing frames to cross the vehicle in the widthwise direction of the vehicle to reinforce a strength of a body of the vehicle;
wherein pillars are coupled to the opposite side ends of the housing frames or the connecting frames;
wherein a roof outer panel is coupled to an upper end of the housing frames or the connecting frames;
wherein a periphery of the airbag door is coupled to a headliner;
wherein the front ends and rear ends of the pair of housing frames are coupled to the roof rail brackets, respectively;
wherein steps engaged with each other are formed at portions where the headliner and the airbag door are matched to be coupled to each other;
wherein coupling holes are formed at overlapping step portions;
wherein coupling bosses inserted into the coupling holes from the upper side is formed at lower ends of the roof rail brackets; and
wherein a fastener is inserted into lower sides of the coupling holes and coupled to the coupling bosses.

* * * * *